United States Patent
Gupta

(10) Patent No.: US 8,171,080 B2
(45) Date of Patent: May 1, 2012

(54) CLICK TO CREATE MEETING MAKERS FROM ELECTRONIC MESSAGES

(75) Inventor: Shekhar Gupta, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 260 days.

(21) Appl. No.: 12/113,671

(22) Filed: May 1, 2008

(65) Prior Publication Data

US 2009/0276497 A1 Nov. 5, 2009

(51) Int. Cl.
*G06F 15/16* (2006.01)
*G06F 7/00* (2006.01)

(52) U.S. Cl. ......... 709/204; 707/708; 707/755; 707/771

(58) Field of Classification Search .................. 709/204; 707/708, 755, 771
See application file for complete search history.

(56) References Cited

U.S. PATENT DOCUMENTS

| 7,505,574 B2 * | 3/2009 | O'Brien et al. ........... 379/202.01 |
| 2003/0014488 A1 * | 1/2003 | Dalal et al. ..................... 709/204 |
| 2005/0144246 A1 * | 6/2005 | Malik ........................... 709/206 |
| 2006/0179114 A1 * | 8/2006 | Deeds ........................... 709/206 |
| 2006/0218224 A1 * | 9/2006 | Agrawal et al. ............... 709/201 |
| 2006/0235690 A1 * | 10/2006 | Tomasic et al. ............... 704/257 |
| 2006/0235691 A1 * | 10/2006 | Tomasic et al. ............... 704/257 |
| 2007/0150513 A1 * | 6/2007 | Vanden Heuvel et al. . 707/104.1 |
| 2008/0139228 A1 * | 6/2008 | Raffel et al. .................. 455/466 |

* cited by examiner

*Primary Examiner* — David Lazaro
*Assistant Examiner* — Vitali Korobov

(57) ABSTRACT

A method and system for generating meeting maker requests as efficiently and with as few steps as possible. Here, a software API or program automatically generates and populates a meeting maker request by using information already located within an electronic message, such as an e-mail, to compose the meeting maker request. One embodiment includes a method for converting an electronic message into a meeting maker. The method comprises receiving an electronic message. Meeting information is located within the received electronic message. Invited attendees to the meeting are determined based on information within the electronic message. A meeting maker request is automatically generated using the determined information.

20 Claims, 8 Drawing Sheets

CLICK TO CREATE MEETING MAKERS FROM ELECTRONIC MESSAGES

BACKGROUND OF THE INVENTION

In modern business environments, there are usually several things you can count on to be consistent. This application relates to two constants in particular. First, nearly everyone has access to e-mail, and second, at some point everyone will more than likely be asked to attend a meeting.

Ordinarily, if a meeting is to be scheduled, a meeting organizer will decide on a time and location as well as the people that should be invited. The meeting organizer can either phone each invited attendee with the details, walk around and personally inform each invited attendee, send an e-mail with the details of the event to each invited attendee, or send a meeting maker request to each invited attendee. Increasingly, "meeting makers" have become a popular method for communicating event or meeting information to invited attendees.

A meeting maker is a request that is delivered via the Internet or some other network, for invited attendees to obtain information regarding a meeting or event. From the meeting maker request that is being viewed, the invited attendees can view the meeting information, select whether they will attend the event, and have the event placed on their electronic calendar. An example of a meeting maker is Microsoft's® Outlook® appointment request functionality, and an example of an electronic calendar is Microsoft's® Outlook® calendar feature.

A meeting maker request may be typed directly into a meeting maker application, which will send out the request to invited attendees. Frequently, however, creating a meeting maker involves multiple steps. An e-mail suggesting or announcing a meeting may be sent to invited attendees. For example, a series of e-mails discussing a topic may be in progress when someone in the e-mail chain decides that calling a meeting would be a good idea. In this case, the invited attendees would need to open the meeting maker software and insert the meeting information into the meeting maker program manually. Most of the meeting information includes information that has already been entered by the user or other senders when composing the e-mail (or e-mail chain), but now the meeting information will have to be entered again into the meeting maker program. Upon receipt of the meeting maker request, the meeting maker may be accepted or declined by each person.

BRIEF SUMMARY OF THE INVENTION

To generate meeting maker requests efficiently and with fewer steps, a software API or program automatically generates and populates a meeting maker request by using information already located within one or more electronic messages to compose the meeting maker request.

One embodiment includes a method for converting an electronic message into a meeting maker. The method includes receiving an electronic message. Meeting information is located within the received electronic message. Invited attendees to the meeting are determined based on information within the electronic message. A meeting maker request is automatically generated using the determined information.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
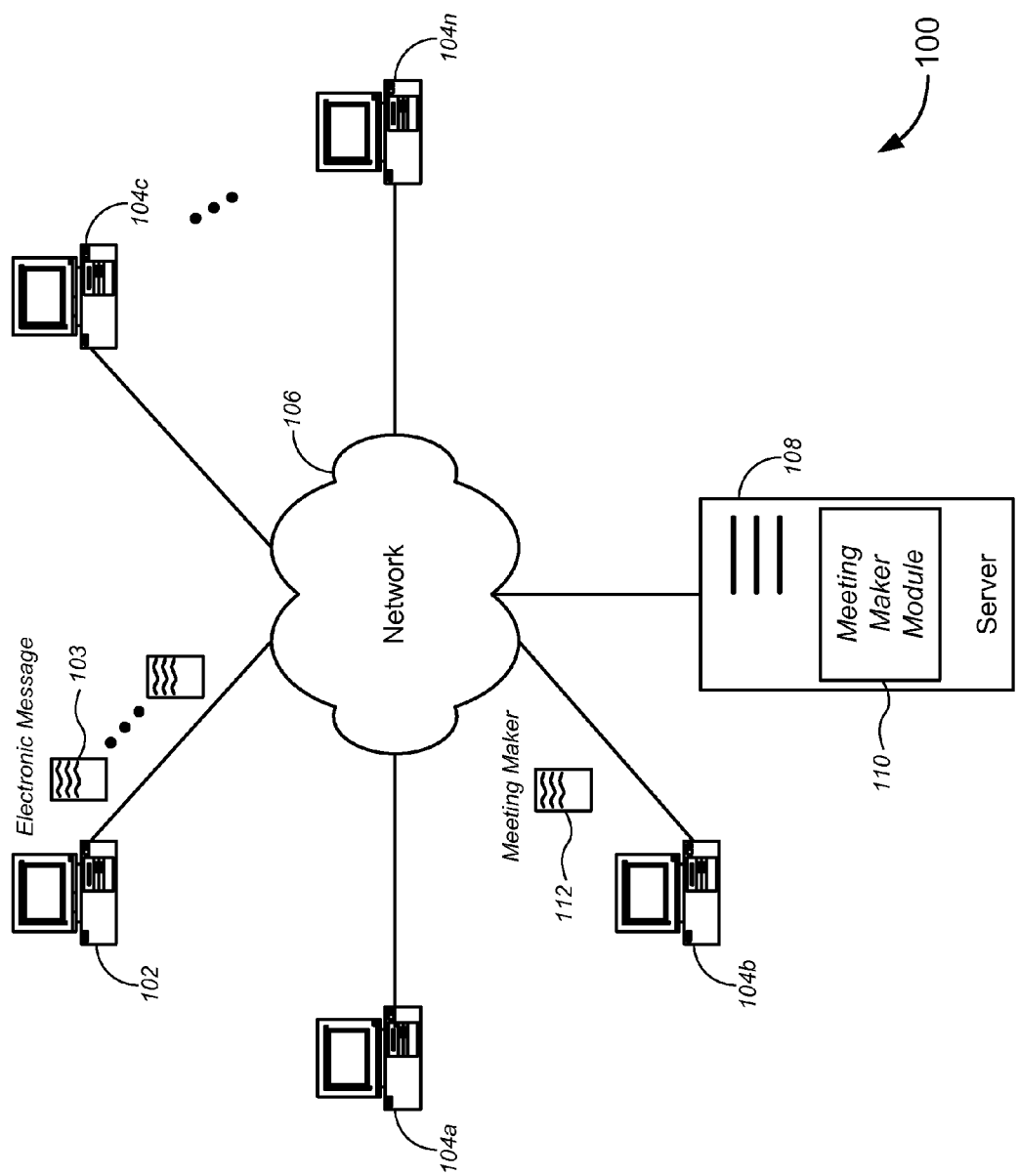
FIG. 1 is an illustration of one embodiment of an environment for converting an electronic message into a meeting maker.

FIG. 1 is an illustration of one embodiment of an environment 100 for converting an electronic message into a meeting maker. In this embodiment, a sending computer 102 may send an electronic message 103 or e-mail to any of receiving computers 104a-104n (collectively 104) over a network 106. A server 108, such as an e-mail server, may also be in communication with the network. The sending computer 102 may be any computing device capable of sending an electronic message 103. The electronic message 103 may be an instant message, fax, e-mail, voicemail, blog, or any other type of message capable of being communicated over the network. The receiving computers 104 may be any type of computing devices capable of receiving an electronic message 103. An example of a sending computer 102 and a receiving computer 104 is a personal computer operating Microsoft® Windows XP®, however, any device capable of communicating an electronic message 103 may be used. A server 108, such as an e-mail server or a server capable of communicating an electronic message 103 between sending computer 102 and receiving computers 104 may also be in communication with the network 106. The server 108 may route the electronic message 103 between computers. The server 108 includes a meeting maker module 110 that parses and converts information included in the electronic message 103 to a meeting maker 112. It should be understood that the conversion of the electronic message 103 to the meeting maker 112 may take place at the server 108, within the sending computer 102, or on any other device in communication with the network 106.

Figure 2:
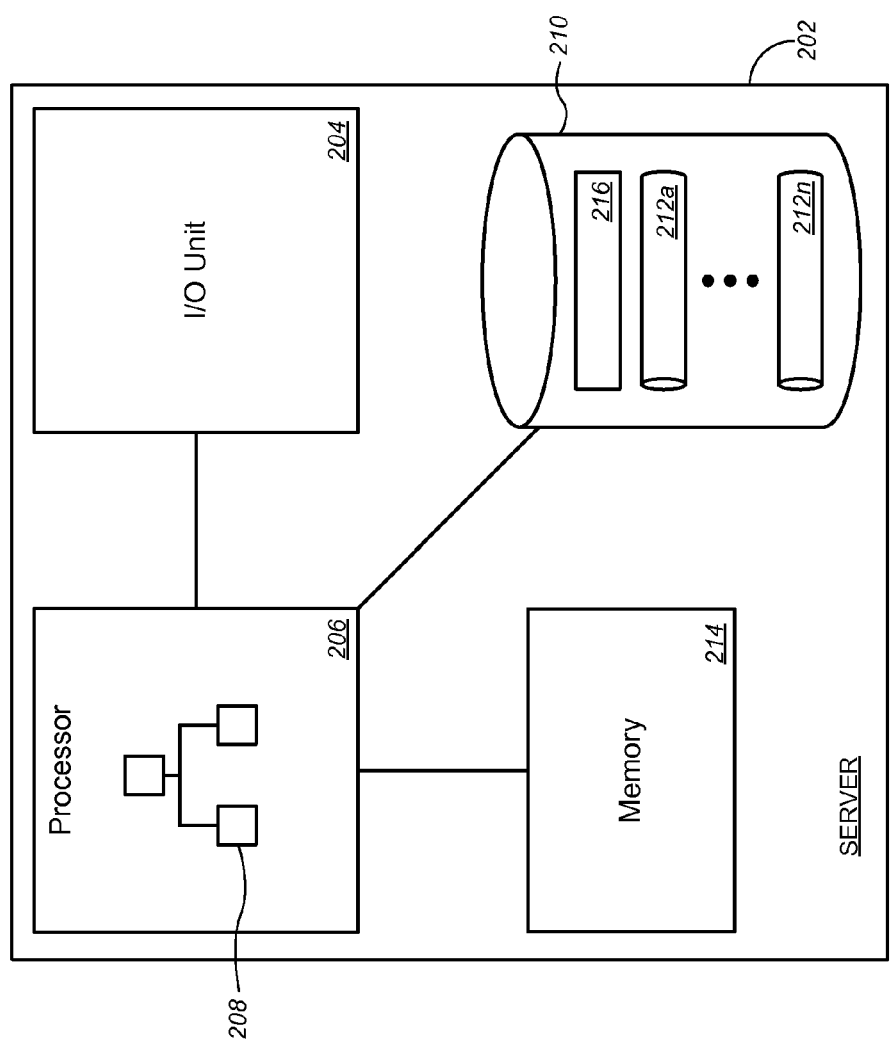
FIG. 2 is a block diagram of one embodiment of components of a server configured to facilitate converting an electronic message into a meeting maker.

FIG. 2 is a block diagram of one embodiment of components of a server configured to facilitate converting an electronic message into a meeting maker. Within the network may be a server 202 in communication with a sending computer (such as 102 in FIG. 1) and receiving computers (such as 104 in FIG. 1). The server 202 may be configured to convert an electronic message to a meeting maker request. As previously described, the server 202 may be a separate server, such as server 108, the sending computer 102, or receiving computers 104 in FIG. 1.

The server 202 may include an input/output (I/O) unit 204 for sending and receiving communications (e.g. an electronic message 103) from the sending computer and the receiving computers. The server 202 may also include a processor 206 for processing the communication of an electronic message (such as 103) and for conversion of the electronic message into a meeting maker. The processor 206 may execute software 208 capable of providing conversion of an electronic message into a meeting maker. The functions for conversion of an electronic message into a meeting maker are described below in greater detail in reference to FIG. 3, which details exemplary software modules.

A storage unit 210 may also be included in the server 202. The storage unit 210 may be a hard drive or any other type of non-volatile memory capable of storing data. Within the storage unit 210 may be one or more databases 212a-212n capable of storing and organizing data, such as the content of the electronic message, while the electronic message is being processed. Storage unit 210 may also include a meeting maker module 216. Meeting maker module 216 may include parsing, decision, and composing logic to prepare a meeting maker from information included in messages. In one embodiment, rather than including a storage unit 210, the server 202 may use memory 214 that is large enough to store sufficient content for the typical use of server 202. The memory 214 may also be located within the server 202 for storing data being processed by the processor 206.

Figure 3:
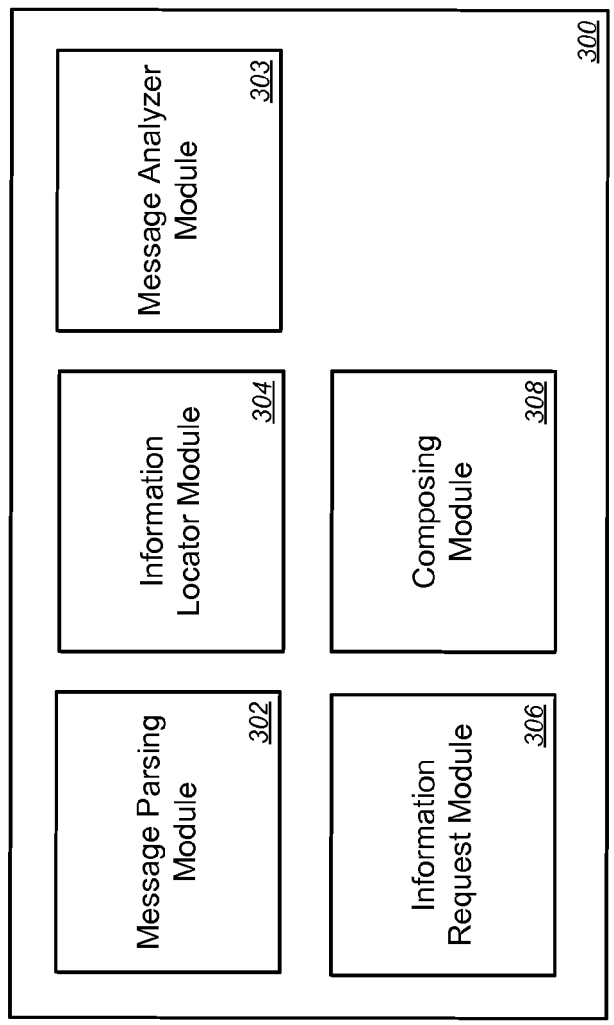
FIG. 3 is a block diagram of one embodiment of modules for converting an electronic message into a meeting maker.

FIG. 3 is a block diagram of one embodiment of modules 300 such as meeting maker modules 110 and 216. Modules 300 convert an electronic message into a meeting maker and may include a message parsing module 302, message analyzer module 303, information locator module 304, information request module 306, and composing module 308.

The message parsing module 302 may be executed to parse an e-mail or any compatible electronic message into a meeting maker request. When the message parsing module 302 is initiated, the content of the electronic message may be parsed into tokens including words, sentences, phrases, numbers, groups of numbers, or any other parseable tokens. The parsed message may then be analyzed in the message analyzer module 303 to determine what information currently located within the electronic message may be used within the meeting maker request.

The initiation of the message parsing module 302 may occur manually when a user selects a button, similar to a "print" or "reply" button located on a message review window (e.g. e mail review window or instant message window). In one embodiment, when a user receives an electronic message, such as an e-mail, along with the typical options to print, reply, or forward the message, another option to "convert to a meeting maker" is available. Alternatively, within or below the text of the electronic document, a hyper-link may be present that enables the receiver of the electronic message to select the link to convert the document to a meeting maker, which initiates the message parsing module 302. In an alternative embodiment, a program may be configured to automatically call the message parsing module 302 as the electronic message is being read, and provide the option to the user to initiate the conversion (and parsing) of the electronic message. For example, a user reading the electronic message may be given a query such as "This message appears to be related to a meeting. Would you like to create a meeting maker now?" The user may select, at that point, to have the information located within the electronic message converted into a meeting maker. These examples are not meant to limit the invention, rather they are simply illustrative embodiments of possible alternatives.

Ordinarily, fields of an electronic message, such as "To:", "CC:", and "Subject:" contain relevant information also needed to create a meeting maker. The message parsing module 302, having parsed the message, along with the message analyzer module 303, may be configured to extract and analyze the data from the fields of an existing electronic message, such as an e-mail, for placement into the meeting maker request. In addition to the above mentioned fields, the message parsing module 302 may also be able to locate necessary information within the text of the electronic message. To accomplish body text analysis, message analyzer module 303 may take the parsed message and analyze the tokens for recognizable and useable information. Message analyzer module 303 may be operable to locate additional information by recognizing keywords (e.g. "located", "at", "from"), or by recognizing 10 digit strings of numbers as telephone numbers, a city followed by a state as potentially being part of an address, or any number of other cues that may be contained in the text of an electronic message. Some additional examples of information located within the message that may be recognized by the message analyzer module 303 include keywords, names, dates, times, keywords in proximity to other words, and many others.

By analyzing the tokens within the electronic messages, various fields may be populated for the meeting request. It is not expected that every electronic message will have all of the necessary information. In the event that an electronic message is not fully populated, the information locator module 304 may be called. The information locator module 304 may be called from the message analyzer module 303 (or separately from another module) to assist in locating information outside of the electronic message, from, for example, a contacts database or electronic address book that may be useful in converting the electronic message into a meeting maker by filling in missing information not found in the electronic message. Another valuable source of information may include information used in previous meeting makers that the information locator module 304 may have access to. Other sources include a corporate directory, the Internet, and many others.

An additional feature of the information locator module 304 may be the ability to choose preferred contact information. For example, if two e-mail addressed or two telephone numbers are known for a user, the preferred one may be chosen over the other. Various other preferences may be located by the information locator module 304, as well.

The information request module 306 may be used for the correction of automatically generated fields of the meeting maker request, or to add additional information not previously located in the received electronic message, which is being converted into a meeting maker request. In the event that the automated portion of the conversion may not find all of the relevant information or may incorrectly recognize information in the electronic message as being relevant information, manual entry or correction of the information may occur. At any time during the conversion process, the information request module 306 may be initiated. The initiation of the information request module 306 may occur automatically at end of the conversion of the electronic message or may occur by a user selecting an option to run the information request module 306. For example, another button (not shown) may be located on a display screen, such as an "Edit" button, for correcting the entries. Additional initiation methods for the information request module may also include a hyperlink, menu pull down option, or any other initiation method capable of initiating the information request module 306.

A composing module 308 may be executed to generate a meeting maker request using information obtained through the various other previously described modules. The composing module 308 may fill in the fields needed for the meeting maker as well as indicate to a user any fields that are missing and allow for manual correction or input. The composing module 308 may also be responsible for checking for calendar conflicts with the composed meeting maker. If a conflict is detected, another time or location may be suggested, or any number of other ways to handle the conflict may be used. Various preferences for meeting makers may also be determined by the composing module 308. One example is if a particular user always likes to copy a boss or an assistant on meeting makers that are created, the preference would be noted and automatically occur. Upon completion of the composition of the meeting maker request, the composing module may initiate the sending of the meeting maker to invited attendees.

Figure 4:
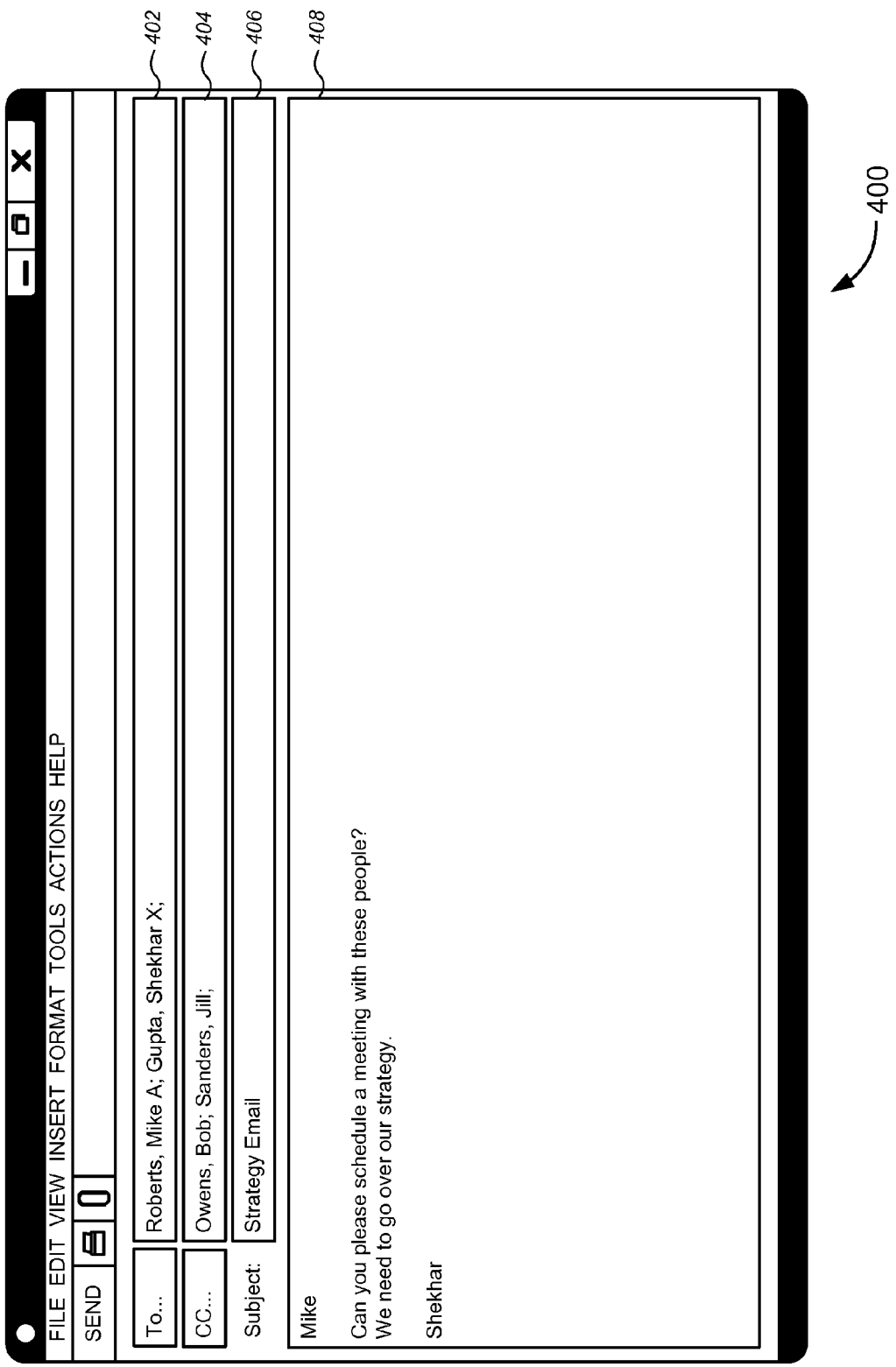
FIG. 4 is a screen shot of one embodiment of an e-mail composition screen.

FIG. 4 is a screen shot of one embodiment of an electronic message composition screen 400. A common type of electronic message, an e-mail, is generally composed on a screen similar to the screen shot 400. The composition screen 400 may contain various fields necessary for the sending of the e-mail. The "To:" field 402 may include any people to which the e-mail is being addressed, the "CC:" field 404 may be similar to the "To:" field 402 in that the e-mail will additionally be sent to anyone whose name is inserted into the field. Often the "CC:" field 404 may be used when the e-mail is not being targeted directly to the person, rather for their benefit, a copy is being sent to them. The "Subject:" field 406 generally may include the topic of the content of the electronic message. The text field 408 may contain the main content of the e-mail. FIG. 4 represents a traditional composition screen 400 that may be used in a different way than in the past. For example, anyone listed in the "To:" field 402 and the "CC:" field 404 may, upon initiation of the e-mail converter module 302, become invited attendees in a meeting maker request. The "Subject:" field 406 may become the subject for the meeting maker request, and the text box 408 may be used to provide additional details to the information locator module 304 and the information request module 306. In one embodiment, if a user composing the e-mail decides to send out a meeting maker request, an option may be provided at this point to convert the composed e-mail into a meeting maker request before being sent. A menu option, button, hyper-link (not shown), or any initiating method similar, may be available on the composition screen 400 to initiate the conversion modules previously described.

Figure 5:
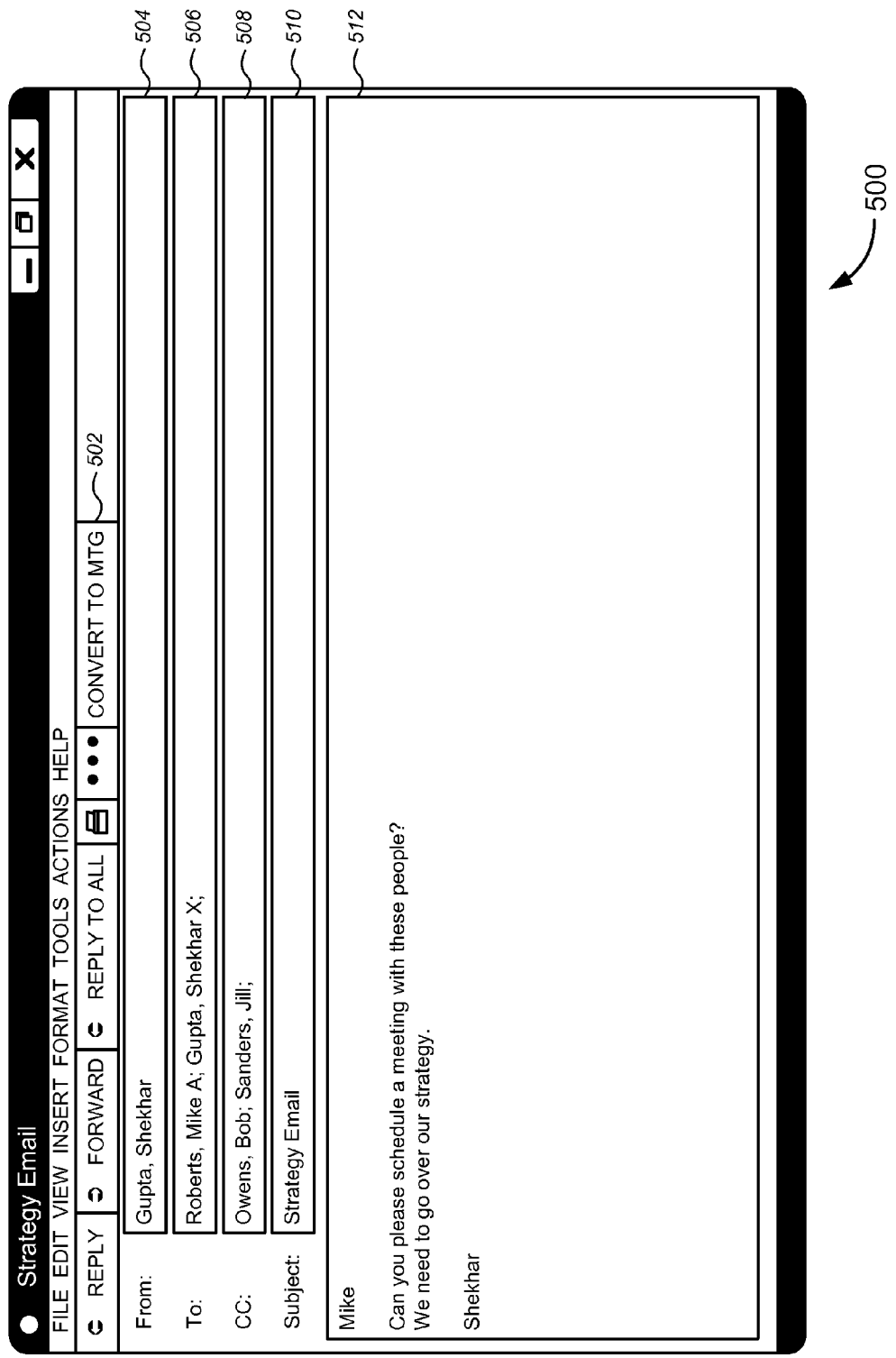
FIG. 5 is a screen shot of one embodiment of an e-mail viewing screen.

FIG. 5 is a screen shot of an exemplary e-mail viewing screen 500. Upon receipt of an electronic message, or in this example, an e-mail, the e-mail viewing screen 500 may be displayed. A "convert to meeting" button 502, may appear for implementing the initiation of the electronic message to meeting maker conversion. In addition to the "convert to meeting" button 502, a pull down menu option, hyperlink, or any similar way to initiate the conversion may be used. Additionally displayed may be the "From:" field 504 displaying the sender of the e-mail, and a "To:" field 506 and "CC:" field 508 displaying the recipients of the e-mail. A "Subject:" field 510 may display the same subject inserted in the "Subject:" field 406 from FIG. 4. Similarly, the text field 512 displays the content entered into the text box 408 of FIG. 4. Upon selection of the "convert to meeting" button 502, the conversion of the e-mail may begin and the meeting maker request may become populated with the generated information.

Figure 6:
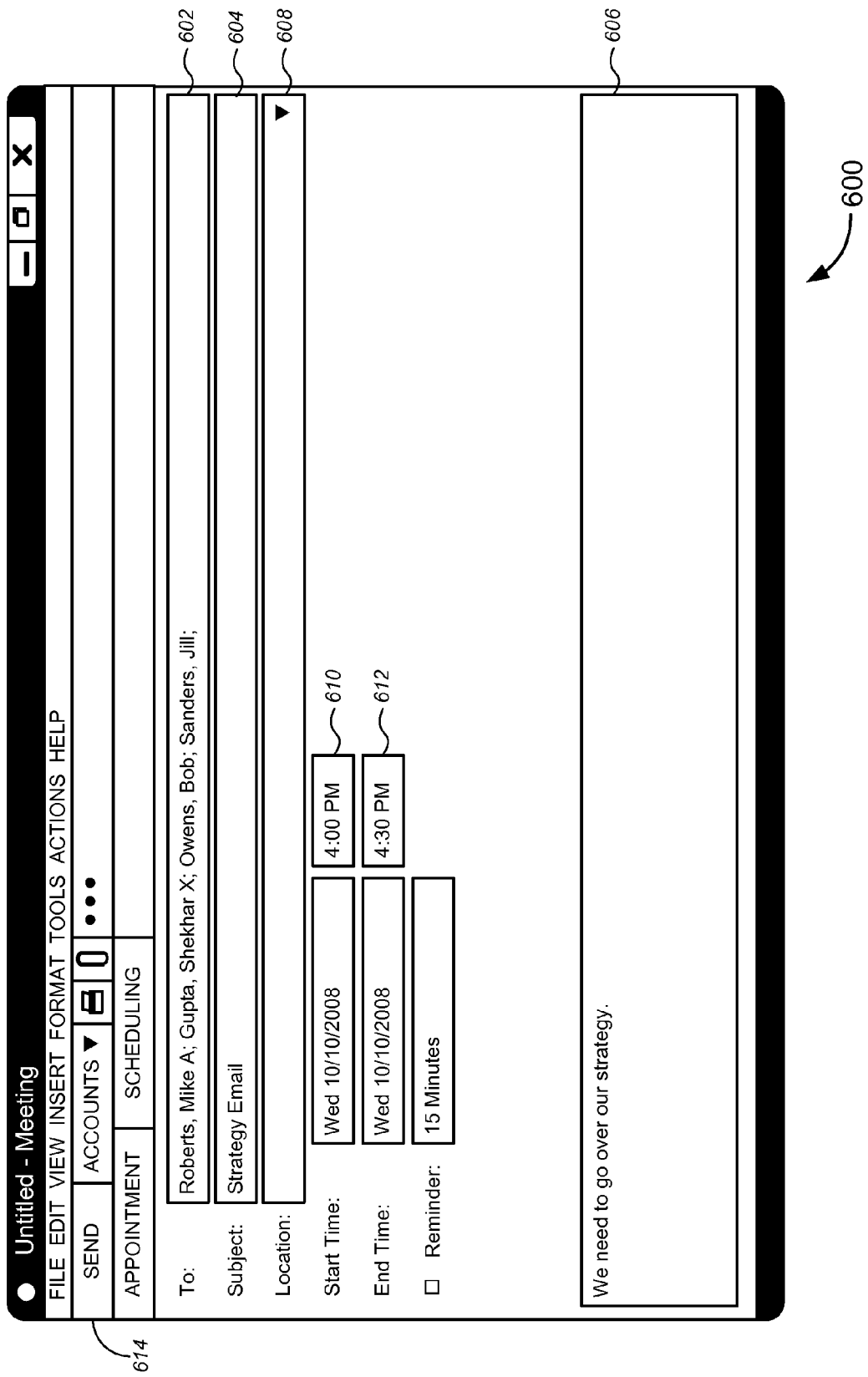
FIG. 6 is a screen shot of one embodiment of a meeting maker composition screen.

FIG. 6 is a screen shot of one embodiment of a meeting maker composition screen 600, such as one that may be populated upon the selection of the "convert to meeting" button 502 in FIG. 5. The "To:" field 602, may be automatically populated from the "To:" field 506 as well as the "CC:" field 508 from the e-mail viewing screen in FIG. 5. Additionally, the subject field 604 may be populated from the subject field 510 from FIG. 5. A meeting description field 606 may be generated from the subject field 510 of FIG. 5, in whole or in part. The message parser module 302 and the message analyzer module 303 may analyze the text field 512 and use information located therein to generate the meeting description field 606. As described earlier, if key terms are located within the text field 512, the key terms and any surrounding relevant information may be used to automatically populate the fields shown in the meeting maker composition screen 600.

Some information may not be present in the received e-mail to be converted, such as the location field 608, start time field 610, and end time field 612. Using the information locator module 304 to locate external sources of information, the information request module 306 described in FIG. 3, or manually interacting with the meeting maker composition screen 600, additional missing details necessary for the meeting maker request may be generated. Any other fields that have been pre-populated may be updated at the meeting maker composition screen 600, as well. For example, the e-mail may not have included an invitee that the user would like to invite. While they were not included on the e-mail, they can be added at this time. Once the generated meeting maker request appears as the user would like, the meeting maker request may be sent by clicking or selecting the send button 614.

Figure 7:
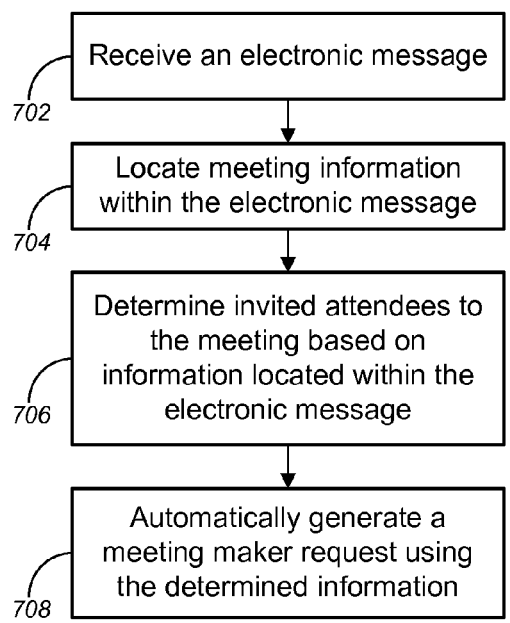
FIG. 7 is a flow chart of one embodiment of a process for converting an electronic message into a meeting maker.

FIG. 7 is a flow chart of an exemplary process for converting an electronic message into a meeting maker. As described above, a meeting maker may be an electronic request, similar to an entry into an electronic calendar that allows the originator to input invited attendees to a meeting, the topic, location, or any other information relevant to a meeting. After composition of a meeting maker request, the meeting maker request is sent to invited attendees for their acceptance. In one embodiment, an electronic message is received at step 702. Electronic messages may be an e-mail, instant message, voice mail, fax, blog, or any other message capable of being communicated between computing devices on a network. Meeting information may be located within the electronic message at step 704. Meeting information may include the time, location, attendees, the subject matter of the meeting or any other meeting-relevant information. At step 706, invited attendees to the meeting are determined based on information within the electronic message. The attendees may be located within any of the fields of the electronic message, including the text body. A meeting maker request is automatically generated using the determined information in step 708.

Figure 8:
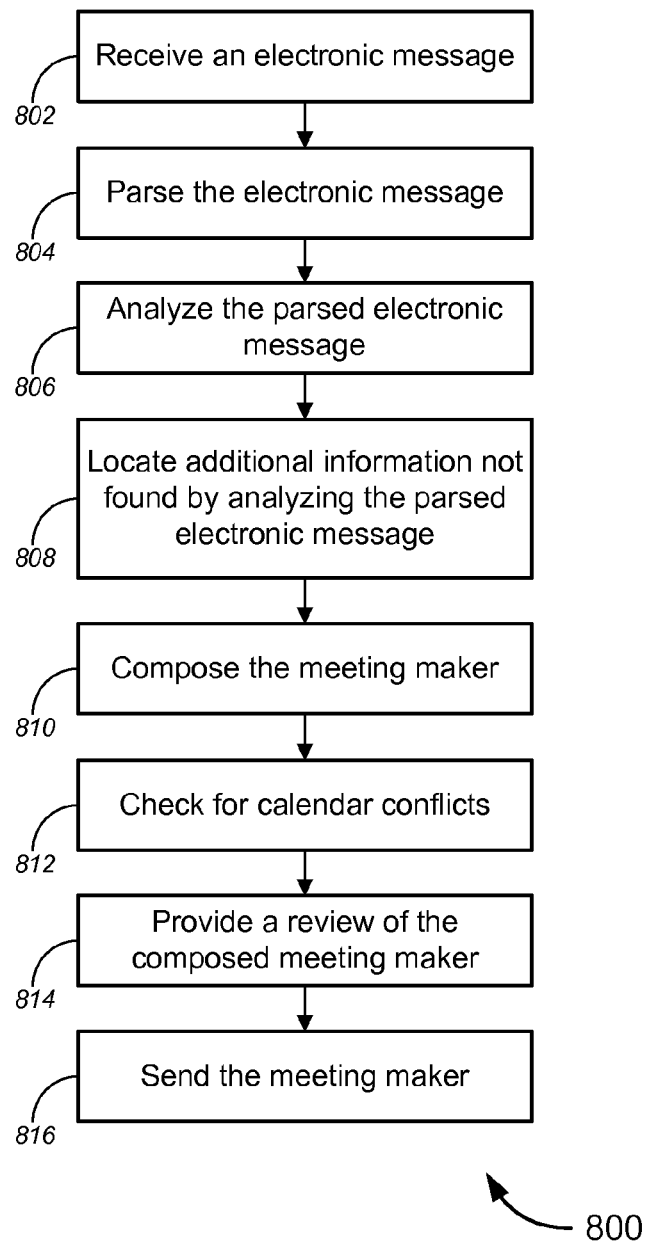
FIG. 8 is a flow chart of another embodiment of a process for converting an electronic message into a meeting maker.

FIG. 8 is a flow chart of another exemplary process for converting an electronic message into a meeting maker. In this embodiment an electronic message may be received in step 802. A parser may be utilized to break the electronic message up into analyzable tokens in step 804. In step 806, an analyzer may analyze the parsed message to locate information within the electronic message that is usable in a meeting maker request. In step 808, information that may be needed for a meeting maker request that was not located in the electronic message may be located in external sources. External sources may include any source that is not the electronic message. The message may be composed in step 810. The message composition may involved compiling the derived information into a meeting maker composition screen 600, such as described in FIG. 6. In step 812, a check for calendar conflicts of the date and time, room location, or any other conflicts may be checked for the composed meeting maker. A review of the composed meeting maker may occur by the user in step 814. Any other changes or additions may be made at this time. In step 816, the meeting maker may be sent to the invited attendees.

The previous detailed description is of a small number of embodiments for implementing the invention and is not intended to be limiting in scope. One of skill in this art will

What is claimed as new and desired to be protected by Letters Patent of the United States is:

1. A system for converting an electronic message into a meeting maker, said the system comprising:
   a processor, operable to execute a set of instructions stored in a memory, the set of instructions are executed by the processor to:
   receive an electronic message;
   parse the electronic message into a plurality of tokens prior to a meeting maker request being generated;
   analyze the plurality of tokens to determine meeting information usable to generate the meeting maker request;
   locate meeting information within the electronic message prior to a meeting maker request being generated;
   determine invited attendees to the meeting, a subject, a meeting time and date, and a location for the meeting maker request based on the meeting information located within the electronic message; and
   check for calendar conflicts, wherein revisions to the meeting maker are proposed in response to determining there are calendar conflicts;
   access one or more data sources to retrieve additional information for generating the meeting maker request in response to determining the meeting information is insufficient to fully populate the meeting maker request;
   automatically generate a the meeting maker request using the invited attendees and the meeting information in response to a displayed button being depressed or a link being clicked; and
   present the meeting maker request for approval by the user before sending the meeting maker request, wherein
   the memory is further operable to store the meeting maker request.

2. The system according to claim 1, wherein the processor, when receiving an electronic message, receives an e-mail or instant message. and wherein the processor determines a text field for the meeting maker request.

3. The system according to claim 1, wherein the processor, when determining, is further operable to locate a description in the electronic message for use as the subject for the meeting maker.

4. The system according to claim 1, wherein the processor, when determining is further operable to locate the invited attendees to the meeting, the subject, the meeting time and date, and the location.

5. The system according to claim 1, wherein the processor, when determining invited attendees to the meeting, locates invited attendees listed within one of a "To" field, a "CC" field, or a text body.

6. The system according to claim 1, wherein the processor is further operable to query the user for changes or additions to the generated meeting maker request while presenting the meeting maker request.

7. The system according to claim 1, wherein the processor, when automatically generating a meeting maker request, generates the request in response to the user generating an e-mail.

8. The system according to claim 1, wherein the one or more data sources includes a contacts database or directory, and records of historical meeting maker requests.

9. The system according to claim 1, wherein the processor is further configured to determine preferred information for the meeting maker based on known preferences.

10. A method for converting an electronic message into a meeting maker, said method comprising:
    receiving an electronic message;
    parsing the electronic message into a plurality of tokens prior to a meeting maker request being generated;
    analyzing the plurality of tokens to determine meeting information usable to generate the meeting maker request;
    determining invited attendees to the meeting, a subject, a meeting time and date, and a location for the meeting maker request based on the meeting information;
    checking for calendar conflicts, wherein revisions to the meeting maker are proposed to a user in response to determining there are calendar conflicts;
    accessing one or more data sources to retrieve additional information for generating the meeting maker request in response to determining the meeting information is insufficient to fully populate the meeting maker request;
    automatically generating a meeting maker request using the invited attendees and the meeting information in response to a displayed_button being depressed or a link being clicked; and
    presenting the meeting maker request for approval by the user before sending the meeting maker request in response to a selection from the user.

11. The method according to claim 10, wherein receiving an electronic message includes receiving an e-mail or instant message, and wherein the processor determines a text field for the meeting maker request.

12. The method according to claim 10, wherein determining, further includes locating a description in the electronic message for use as the subject for the meeting maker request.

13. The method according to claim 10, wherein determining, further includes locating the invited attendees to the meeting, a subject, a meeting time and date, and a location.

14. The method according to claim 10, wherein determining invited attendees to the meeting, further includes locating invited attendees listed within one of a "To" field, a "CC" field, or a text body.

15. The method according to claim 10, further comprising querying a user for changes or additions to the generated meeting maker request while presenting the meeting maker request to the user.

16. The method according to claim 10, wherein automatically generating a meeting maker request, further includes generating the request in response to the user receiving an e-mail.

17. The method according to claim 10, further comprising locating the additional information from one or more data sources outside of the electronic message.

18. The method according to claim 10, further comprising determining preferred information for the meeting maker based on known preferences.

19. A server for automatically generating a meeting request, the server comprising:
    a processor for executing a set of modules; and
    a memory for storing the set of modules for execution by the processor, the set of modules comprising:
    a message parsing module operable to automatically parse an electronic message into tokens for determining meeting information prior to the meeting maker request being generated, wherein the electronic message is communicated through the server;
    a message analyzer module operable to analyze the tokens of the parsed message to determine the meeting information within the electronic message that is usable for generating the meeting maker request, wherein the meeting information is utilized to determine at least invitees, contact information for the invitees, a meeting time, and a location to form a parsed message in response to the electronic message being communicated;

an information locator module operable to access one or more data sources to retrieve additional information for generating the meeting maker request in response to determining the meeting information is insufficient to fully populate the meeting maker request; and a composing module operable to automatically generate the meeting request utilizing the meeting information that is determined to be usable for presentation to a user, wherein the composing module is further operable to check for calendar conflicts, wherein the composing module proposes revisions to the meeting maker request to the user in response to determining there are calendar conflicts, and wherein the composing module presents the meeting maker request for approval by the user before sending the meeting maker request.

20. The server according to claim 19, wherein the set of modules further includes:

an information locator module operable to access one or more data sources to retrieve additional information for generating the meeting maker request in response to determining the meeting information is insufficient to fully populate fields of the meeting maker request.

* * * * *